United States Patent

[11] 3,584,938

| [72] | Inventor | Frank W. Lindblom |
| | | Warwick, R.I. |
| [21] | Appl. No. | 839,858 |
| [22] | Filed | July 8, 1969 |
| [45] | Patented | June 15, 1971 |
| [73] | Assignee | Welsh Manufacturing Company |

[54] ADJUSTABLE LENGTH TEMPLES
2 Claims, 6 Drawing Figs.

[52] U.S. Cl. .................................................. 351/118, 351/111
[51] Int. Cl. ...................................................... G02c 5/20
[50] Field of Search ........................................... 351/118, 113, 111

[56] References Cited
UNITED STATES PATENTS
3,318,654  5/1967  Kreuzberger et al. ........ 351/118

*Primary Examiner*—David Schonberg
*Assistant Examiner*—John W. Leonard
*Attorney*—Barlow and Barlow ABSTRACT: An adjustable temple bar for eyeglass frames that comprises two members, one member telescoping into the other member and in which the rear member is provided with a plurality of spaced apertures therein one of which is selectively engaged by a pin that is mounted on a flat spring attached to the forward member which pin passes through an opening in the outer wall of the forward member of the temple bar into an aperture in the rear member that telescopes within the outer member. By such a construction the temples may be selectively adjusted easily and quickly by the user to fit his head.

PATENTED JUN 15 1971 3,584,938

INVENTOR
FRANK W. LINDBLOM
BY
*Barlow & Barlow*
ATTORNEYS

ADJUSTABLE LENGTH TEMPLES

BACKGROUND OF THE INVENTION

In the past many attempts have been made to provide some adjustability in temples. Generally they have taken the form of utilizing a pair of parts that are separable one from the other and which may be selectively engaged into a variety of operating positions relative to each other. All of these attempts have utilized arrangements which sacrifice the rigidity of the temple bar construction and utilize constructions which are expensive to manufacture.

SUMMARY OF THE INVENTION

The present invention provides a temple bar construction that involves two telescoping members which can be easily operated to shorten or lengthen the temple bar as desired in a construction which does not sacrifice the rigidity of the temple bar itself. Specifically the temple bar has a rearward member made from flat metallic stock and is provided with a plurality of apertures therein along with figures to give the length of the bar in inches and fractions of inches. This rearward member is received within a surrounding bore that is provided in the forward member containing the temple hinge, and either attached to or made integral with the plaque for the temple hinge is a long leaf spring having a pin at its free end distant from the plaque which passes through a single opening in the forward member a sufficient distance to cross the bore in the forward member and engage one of the aperture on the flat bar rearward member.

DESCRIPTION OF THE PREFERRED EMBODIMENT

Figure 5:
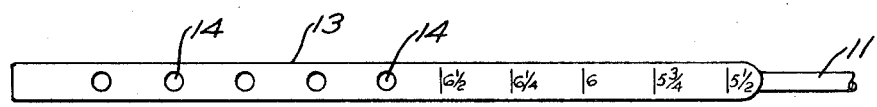
FIG. 5 is a partial elevational view of the rearward temple member.
Figure 6:
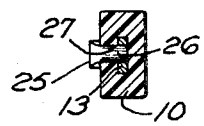
FIG. 6 is a sectional view taken on line 6–6 of FIG. 2.

The temple bar of the invention is essentially a two-part structure having a forward member 10 and a rearward member 11 which are adapted to telescope one within the other. The rearward member 11 is provided with a curved rounded end 12 which is adapted to extend over in back of the ear in the usual way. Extending forwardly from the rounded end 12 is a flat metal portion 13 that is provided with a plurality of apertures 14 and the surface of this bar 13 is graduated or marked with figures as at 15 (see FIG. 5) to give the length of the temple bar when fully or partly extended, the graduations being indicated in normal optical fashion in inches and fractions of an inch.

Figure 1:
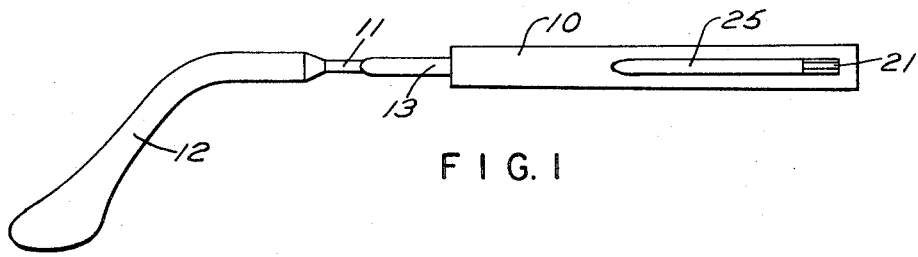
FIG. 1 is an elevational view of the temple bar embodying the principles of the present invention.
Figure 2:
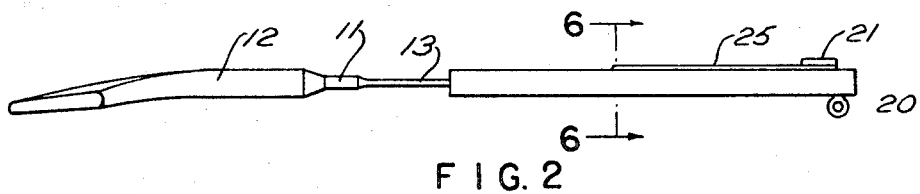
FIG. 2 is a bottom view thereof.
Figure 3:
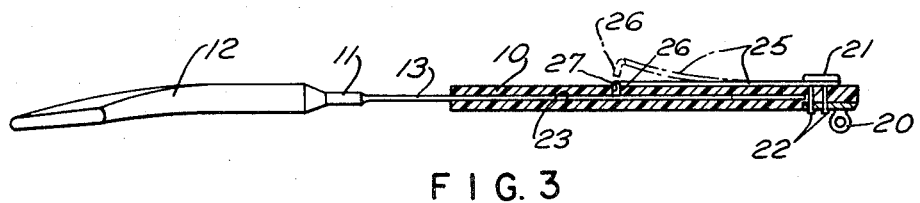
FIG. 3 is a bottom view partly in section illustrating the manner of engagement of the pin.
Figure 4:
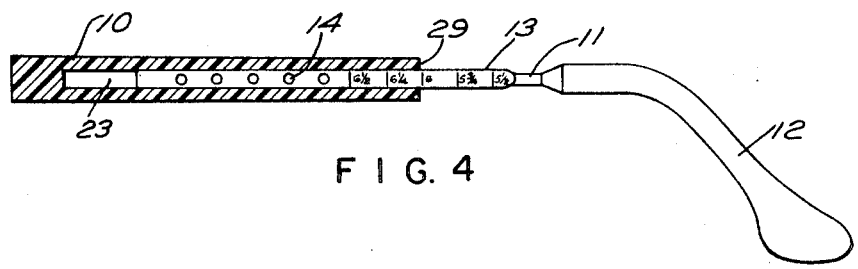
FIG. 4 is a longitudinal sectional view.

The end 10 of the forward member bar is provided with the usual hinge joint 20 which is fastened to the temple bar by the use of a rivet plaque 21 having a pair of rivet pins 22 that pass through the temple bar and are riveted to the flat plate of the hinge 20. A central bore 23 is formed in this forward member of a size and configuration to receive the flat portion 13 of the rear member of the temple bar. Sliding clearance between the portion 13 and the bore 23 is on the order of 0.002 of an inch and permits an acceptable slip fit without providing excessive play between the two members. The bore 23 may be readily formed in the forward member 10 by extruding this member by known extruding techniques and the forward end of the bore may be closed at the point of attachment of the hinge 20 by filling the same and fusing plastic material therein with known welding techniques. An elongated flat spring 25 is secured underneath the flat plate 21 and has at its free or rear end a dowel or pin 26 which passes through an opening 27 that extends from the outer face 28 of the forward member of the temple bar and intersects the bore 23. With the rear portion 13 received within the bore 23 the pin 26 will engage one of the apertures 14 and hold the two members in positive position. To change the adjusted position between the parts, it is merely necessary to use the thumb nail and lift the long leaf spring 25 to disengage the pin 26 from one of the apertures 14 and slide the members of the assembly to another position so that another of the apertures 14 may be engaged. To facilitate the use of this arrangement, a scale marking as shown more clearly in FIG. 5 and which consists of longitudinal markings with indicia stamped in conventional optical inch markings has been shown. It will be appreciated by referring to FIG. 4 that the scale is progressively uncovered as the temple bar length is extended, the transverse line that appears adjacent the indicia being at the end wall 29 when an aperture 14 is in alignment with the pin opening 27 so that the pin 26 may enter.

It will be apparent that there is provided a simple rigid temple bar construction in which a minimum number of parts is required and which will provide a normal range of adjustments to fit an individual user. It is particularly adapted to the sunglass and safety spectacle products which will reduce the inventory of the length of temple bars that are normally stocked and which will provide the necessary fitting of an individual wearer and yet a pleasing appearance.

I claim:

1. An adjustable temple bar comprising a forward member adapted at one end thereof to be hingeably connected to an eyepiece frame, said forward member having a longitudinal bore generally centrally located therein with inner and outer walls, a rear member having an ear piece at one end and the portion at the other end of similar cross-sectional shape to said bore and telescopingly received therein, said portion having a plurality of spaced apertures therein, an elongated flat leaf spring secured adjacent one end to and extending along the outer surface of an outer wall of said forward temple member and having at its other free end an inwardly extending pin, said forward temple member having an opening from the outer wall intersecting said bore, said pin extending through said opening and engaging one of the apertures on said rear member to maintain the two members of the temple bar in adjusted position.

2. An adjustable temple bar for an eyeglass frame as set forth in claim 1 in which the flat leaf spring is secured to the outer wall of the temple bar by a hinge plaque.